May 19, 1925.
F. A. SMITH
TIRE CHAIN
Filed July 10, 1923
1,538,668
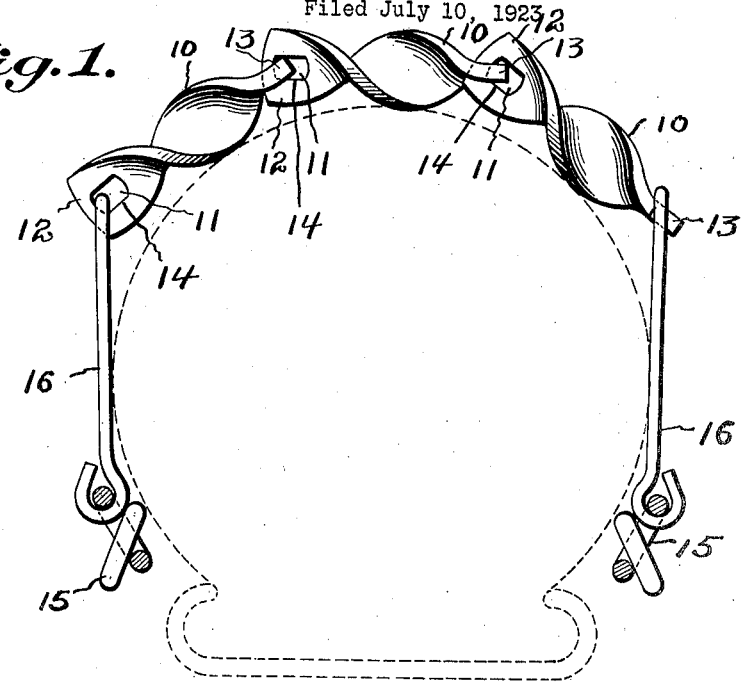
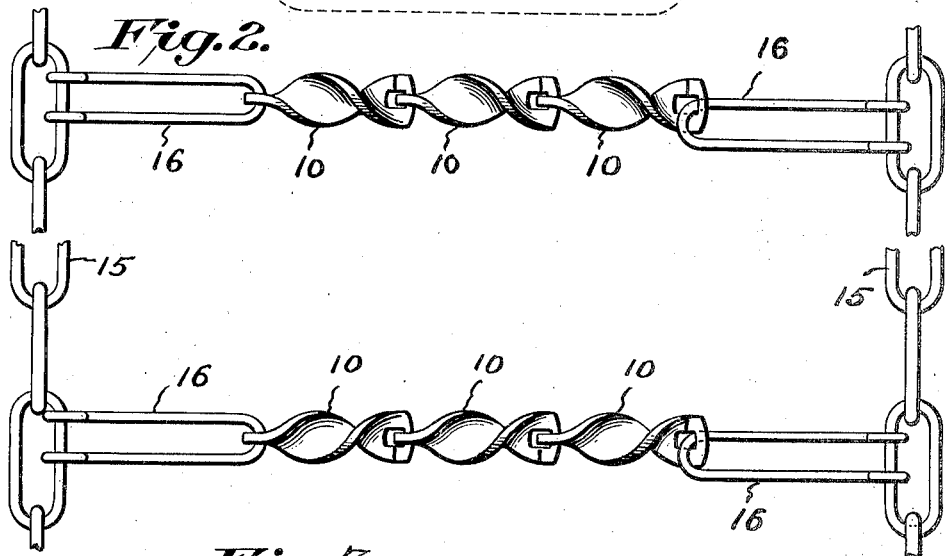
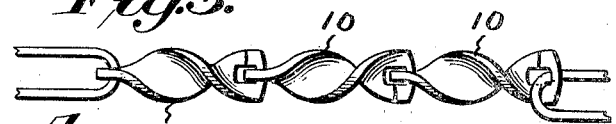
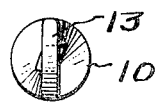

Patented May 19, 1925.

1,538,668

UNITED STATES PATENT OFFICE.

FRANK A. SMITH, OF UNION CITY, CONNECTICUT.

TIRE CHAIN.

Application filed July 10, 1923. Serial No. 650,691.

*To all whom it may concern:*

Be it known that I, FRANK A. SMITH, a citizen of the United States, residing at Union City, in the county of New Haven and State of Connecticut, have invented certain new and useful Improvements in Tire Chains, of which the following is a specification, reference being had therein to the accompanying drawings.

This invention relates to an improved tire chain for motor vehicles and it is the principal object thereof to provide a simple, effective and economical device for ready attachment to the tire of a motor vehicle wheel, to prevent skidding.

Among other aims and objects of the invention may be recited the provision of a device of the character mentioned with a view to compactness, in which the construction is simple, the cost of production small, but efficiency and operation high.

The improvements in the details and arrangement of parts will be apparent from an inspection of the accompanying drawings, in connection with the description hereinafter contained, and wherein a preferred embodiment of the invention is disclosed for the purpose of imparting an understanding of the same.

In the drawings, in which like numerals of reference designate like parts in several figures;

Figure 1 is an elevation of one of the sets of cross chains in its operative relation to a motor vehicle tire, shown therein by dotted lines, and the securing means connecting the same therewith.

Figure 2 is a plan view of two of such sets of cross chains shown in a horizontal plane and a fragmentary view of the securing means therefor.

Figure 3 is a detail plan view of one of the forms of cross chains; and

Figure 4 is an end view of one of the links.

In the practice of my invention I provide a plurality of solid links 10, which are made of flat material with an opening 11 in each end thereof and twisted or turned in helical form so that the opposite ends 12 and 13 are generally at substantially a right angle to each other but may occupy any other relation if desired. These links are variously formed, some, such as shown in Figure 1, and the upper set in Figure 2 having a right hand twist, while those in the lower portion of Figure 2 have a left hand twist, and those in Figure 3 have an alternate right and left hand twist.

These links before being assembled are open at 14, and after the adjacent link or hook is inserted in the opening 11, this opening is closed, and if desired, is then either welded, brazed or otherwise secured so as to form a solid closed structure.

I have shown in the drawings three of these links grouped together to constitute one cross chain but a greater or less number may be used equally as well, depending in some measure upon the size of the tire and the length of the link.

The side chains illustrated are composed of a plurality of open links 15, to which the cross chains are connected by the hooks 16.

With this type of tire chain having twisted or spiral solid links in the cross chain, the narrow edges of the links take the wear, because they contact with the traction surface. As the links are made of solid bars of metal they are not crushed by objects with which they are brought into contact and the wearing life of the chain is thus materially increased. When the link edges are worn down the relative position of the cross chains may be reversed relatively to the tires and the worn edges placed in contact with the tire, thus presenting to the traction surface the opposite and unworn edges.

The spiral links being comparatively short in length have a relative movement in relation to each other, thereby adjusting themselves to any size tire, minimizing the shock upon the tire, and as each link rolls relatively to its adjacent link permits the chain to adjust itself to inequalities in the road, depressions in the tire, or both, etc. This is not possible with the type of antiskid devices wherein a twisted element is made in a single piece and extends across the periphery of the tire.

Any sidewise movement of the motor vehicle causes the spiral edges of the link to grip the traction surface and thus prevent lateral skidding. This gripping action is enhanced materially when some of the cross chains are arranged with a right twist, and others with a left twist and also where the links in each cross chain are alternately arranged with a right and left twist as shown in Figure 3. Thus, if a link with one direction twist is not effective the next link in the cross chain with the opposite twist will be, as it tends to drag and pull against the twist of the adjacent link. These links may be made with hardened edges, thus providing a glass hard wearing surface but retaining a soft core. The depth and extent of the soft core is varied to meet service conditions.

Having described my invention, what I claim as new and desire to secure by Letters Patent, is:—

1. Cross chains for a tire chain composed of a plurality of solid links of helical form, having openings at the opposite ends thereof and joined together so that the outer spiral edge of one link at the end of the link are at substantially a right angle to the similar edges of the adjacent link and intersect each other.

2. A cross chain for a tire chain composed of a plurality of solid links joined together, each link being in twisted or spiral form, some of the links having a right hand twist and others a left hand twist.

3. A cross chain for a tire chain composed of a plurality of solid links joined together, each link being in twisted or spiral form, some of the links having a right hand twist and others a left hand twist arranged alternately relatively to each other.

In testimony whereof, I have hereunto affixed my signature.

FRANK A. SMITH.